United States Patent [19]
Martin et al.

[11] Patent Number: 5,404,977
[45] Date of Patent: Apr. 11, 1995

[54] FLUID FRICTION COUPLING

[75] Inventors: Hans Martin, Stuttgart; Werner Hummel, Affalterbach, both of Germany

[73] Assignee: Behr GmbH & Co., Stuttgart, Germany

[21] Appl. No.: 82,482

[22] Filed: Jun. 28, 1993

[30] Foreign Application Priority Data

Jun. 30, 1992 [DE] Germany .................. 42 21 450.5

[51] Int. Cl.⁶ .............................................. F16D 35/00
[52] U.S. Cl. .................... 192/58 B; 192/82 T
[58] Field of Search ........................ 192/58 B, 82 T

[56] References Cited

U.S. PATENT DOCUMENTS

| | | | |
|---|---|---|---|
| 2,792,095 | 5/1957 | Sherman | 192/58 B |
| 3,259,220 | 7/1966 | Roper | 192/82 T |
| 4,188,785 | 2/1980 | Ando et al. | 60/325 |
| 4,544,053 | 10/1985 | Yamaguchi et al. | 192/58 B |
| 4,570,771 | 2/1986 | Yamaguchi et al. | 192/58 B |
| 4,574,929 | 3/1986 | Hayashi et al. | 192/58 B |
| 4,924,987 | 5/1990 | Kennedy | 192/58 B |
| 4,995,494 | 2/1991 | Kennedy et al. | 192/58 B |

FOREIGN PATENT DOCUMENTS

| | | |
|---|---|---|
| 0439859 | 8/1991 | European Pat. Off. . |
| 3122958 | 1/1983 | Germany . |
| 3242381 | 6/1983 | Germany . |
| 3324982 | 1/1984 | Germany . |
| 2099960 | 12/1982 | United Kingdom . |

*Primary Examiner*—Richard M. Lorence
*Attorney, Agent, or Firm*—Foley & Lardner

[57] ABSTRACT

To increase the idling rotational speed of a fluid friction coupling, the static pressure in the reservoir space is increased by a differential pressure valve which opens toward the reservoir chamber at a defined differential pressure between the working chamber and the reservoir chamber. The fluid friction coupling includes a driving element; a driven-end coupling housing including a reservoir chamber and a working chamber; a partition for separating the reservoir chamber from the working chamber; a return passage arranged in the coupling housing between the working chamber and the reservoir chamber; and a differential pressure valve arranged within or in the region of the return passage.

12 Claims, 2 Drawing Sheets

FLUID FRICTION COUPLING

BACKGROUND OF THE INVENTION

The invention relates to a fluid friction coupling which has a reservoir chamber and a working chamber separated by a partition such as is known, for example, from DE-C 28 14 608.

In known couplings of this type, the technical problem often is the fact that the idling rotational speed, i.e., the rotational speed at which the driven part of the coupling rotates with the coupling switched off, i.e., with a closed valve lever, is too low. At such low idling rotational speeds, the coupling does not switch on when required because the pressure in the reservoir chamber is too low.

In order to increase the idling rotational speed, it has already been proposed that so-called leakage oil holes should be provided in the partition between the reservoir chamber and the working chamber. There is a continuous flow of oil through these leakage oil holes from the reservoir chamber to the working chamber so that the degree of filling of the working chamber is increased and with it, simultaneously, the idling rotational speed (DE-GM 83 23 498). The leakage oil holes are not, however, sufficient for all purposes.

SUMMARY OF THE INVENTION

An object of the present invention is, therefore, to increase the idling rotational speed of couplings of the generic type by means of simple measures and, if possible, also to stabilize this idling rotational speed to a defined rotational speed level.

These and other objects and advantages of the invention are achieved by a fluid friction coupling including a driving element, the driving element including a driving disk and a driving shaft; a driven-end coupling housing including a reservoir chamber and a working chamber wherein the driving disk rotates in the working chamber; a partition for separating the reservoir chamber from the working chamber; a back-pressure body arranged in the working chamber; a return passage arranged in the coupling housing between the working chamber and the reservoir chamber; an inlet opening between the reservoir chamber and the working chamber; a valve lever for controlling the inlet opening; and a differential pressure valve arranged within or in the region of the return passage, which differential pressure valve opens toward the reservoir chamber at a defined differential pressure between the working chamber and the reservoir chamber.

Further objects, features, and advantages of the invention will become apparent from the following detailed description taken in conjunction with the accompanying figures.

BRIEF DESCRIPTION OF THE DRAWINGS

The drawings are expressly made a part of the specification.

DETAILED DESCRIPTION OF THE PREFERRED EMBODIMENTS

The present invention is based on the knowledge that an increase in the idling rotational speed can be achieved by increasing the static pressure in the reservoir space. This takes place by using the differential pressure valve according to the invention, whose opening pressure is added to the static pressure in the reservoir chamber. In consequence, less oil flows from the working chamber into the reservoir chamber and the degree of filling of the working chamber increases and, as a result, the idling rotational speed increases as well. Because the opening pressure can be set in such a differential pressure valve—by the selection of a suitable return spring, for example—the level of the desired idling rotational speed can also be determined.

In accordance with an advantageous embodiment of the invention, the differential pressure valve can be configured as a non-return valve or as a spring-loaded ball valve, which is arranged in either the radially or the axially extending part of the return passage between the working chamber and the reservoir chamber. Arrangement in an axially extending hole provides the advantage that the valve characteristic is substantially independent of the rotational speed of the coupling. In the case of an arrangement in the radially extending part of the return passage, the centrifugal force acts on the valve ball as a function of the rotational speed of the coupling.

Figure 3:
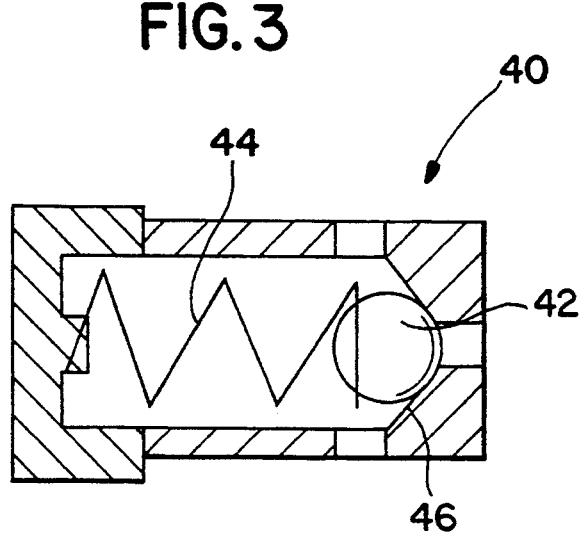
FIG. 3 shows a valve insertion cartridge.

In accordance with a further configuration of the invention, the differential pressure valve is accessible from outside so that it can be exchanged. It is furthermore advantageous for the valve to be configured as an insertion cartridge 40 (FIG. 3) which can be inserted in a uniform hole of the coupling housing. The valve insertion cartridge 40 includes a ball 42 and a helical spring 44. The valve ball 42 is pressed by the valve spring 44 against a conical seat 46. The conical seat 46 opens into the return passage between the working chamber and the reservoir chamber. By this means, different valve types with different opening pressures can be installed in a uniform construction of the coupling housing and can be subsequently exchanged.

Figure 1:
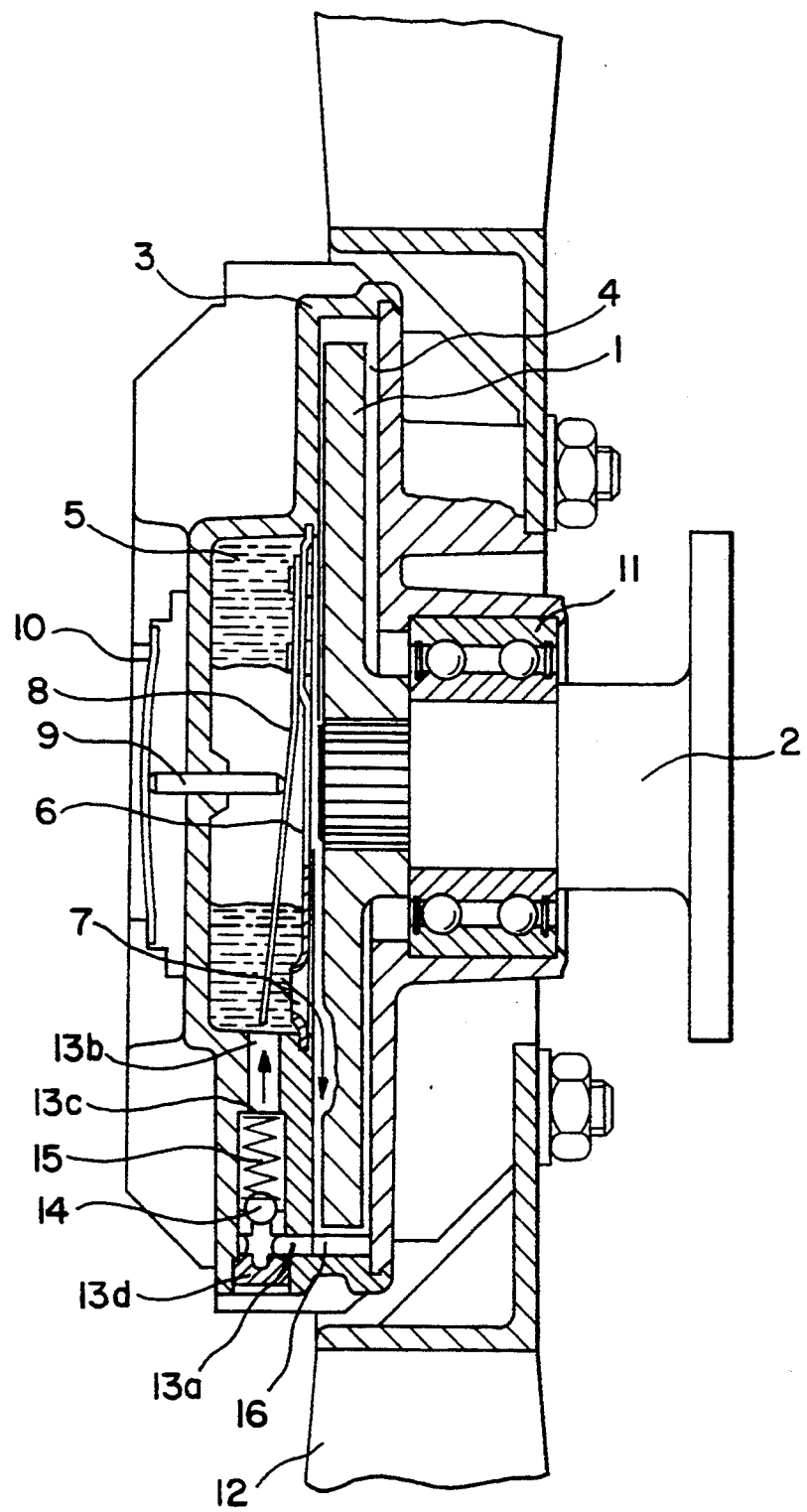
FIG. 1 shows an axial section through the coupling with a differential pressure valve in the radially extending passage part.

FIG. 1 shows, in section, a fluid friction coupling such as is used as the fan coupling for the cooling of internal combustion engines in motor vehicles. At its driving end, which is formed by a driving shaft 2 and a driving disk 1, this fluid friction coupling is driven by the internal combustion engine directly or via a V-belt drive. The output drive takes place via a coupling housing 3 which has a working chamber 4 and a reservoir chamber 5 separated from one another by a partition 6. There is a viscous medium (silicone oil) in the coupling, which is represented in the reservoir chamber 5 as a fluid ring which is formed by centrifugal force when the coupling housing 3 rotates. The driving disk 1 rotates in the working chamber 4 and forms shear gaps.

In the partition 6, there is, on the one hand, a valve opening 7 which is controlled by a valve lever 8 which is in turn controlled, via a switching pin 9, by means of an externally arranged bimetal unit 10.

On the other hand, there is a return passage between the working chamber 4 and the reservoir chamber 5. The return passage is formed by an axially extending part 13a and a radially extending part 13b and therefore produces a connection between the working chamber 4 and the reservoir chamber 5. A back-pressure body 16 is arranged in the working chamber 4 in the region of the inlet opening of the return passage 13a and this back-pressure body 16 deals with the return of the viscous medium from the working chamber 4 to the reservoir chamber 5. The supply of the viscous medium takes place via the valve opening 7 so that there is a circulation of the viscous medium between the reservoir chamber 5 and the working chamber 4 when the valve 7, 8 is open—as is indicated by the two arrows. The coupling housing 3 carries fan blading 12 and is rotatably supported on the driving shaft 2 by means of the rolling contact bearing 11.

A differential pressure valve, which consists of a ball 14 and a helical spring 15, is located in the radially extending part 13b of the return passage between the working chamber 4 and the reservoir chamber 5. One end of the helical spring 15 is supported on a stop 13c in the return passage 13b and the other end presses the ball 14 onto a conical seat which is formed by a valve insert 13d. The latter has a cruciform arrangement of holes which are in connection, on the one hand, with the radially extending part 13b of the return passage and, on the other hand, with the axially extending part 13a of the return passage.

Figure 2:
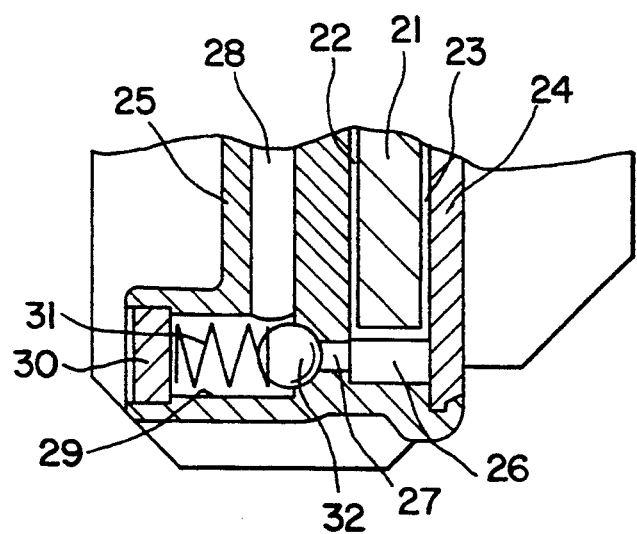
FIG. 2 shows the differential pressure valve in an axially arranged hole.

FIG. 2 shows a second embodiment of the differential pressure valve in an excerpt, shown enlarged, of the coupling whose driving disk 21, together with the housing walls, forms working gaps 22, 23. A back-pressure body 26 is arranged radially outside the driving disk 21 (i.e., at its peripheral end) and the opening of the axially extending return passage 27 is located in the region of this back-pressure body 26. This part of the return passage 27 is followed, on the one hand, by a radially extending part 28 of the return passage, which leads to the reservoir chamber (not shown) and, on the other, by an axially extending, increased diameter valve hole 29 which is sealed toward the outside by a plug 30. Within this valve hole 29, there is a valve ball 32 which is pressed by a valve spring 31 against a conical seat which opens into the return passage 27. The valve spring 31 can therefore be easily inserted into the hole 29 from the outside and, in consequence, can also be easily exchanged for a different spring.

The mode of operation of the differential pressure valve according to the invention for raising the idling rotational speed is as follows. The fluid friction coupling, i.e., its oil flow, is in equilibrium when the following equation applies $$P_{sV} = P_{sA} + P_{dA},$$

where $P_{sV}$ = static pressure in reservoir space,
$p_{sA}$ = static pressure in working space and
$p_{dA}$ = dynamic pressure in the working space.

If $P_{sV} < P_{sA} + P_{dA}$, the coupling does not switch on—the reason for the excessively low static pressure in the reservoir space is an excessively low idling rotational speed because the latter determines the static pressure in the reservoir space as a function of the centrifugal force. The differential pressure valve according to the invention "artificially" increases the static pressure in the reservoir space because the pressure in the return passage 13a or 27 caused by the closed valve adds to the static pressure in the reservoir space 5 and in the radially extending part of the return passage 13b or 28, respectively. In other words, the respective back-pressure body 16 or 26 in the working chamber must deliver against a higher pressure in the case of a closed differential pressure valve so that more oil builds up in the working space. Therefore, the degree of filling is increased and the idling rotational speed increases. The differential pressure valve offers the additional advantage that the level of the idling rotational speed can be exactly set by selecting the return force of the valve, i.e., by an appropriate spring force of the valve spring or, if required, it can also be exchanged. The relationship which then applies is that the idling rotational speed becomes higher as the spring force of the valve spring in the differential pressure valve becomes greater. In consequence, the idling rotational speed can be accurately set both before the installation of the coupling and after its installation or it can be corrected as required.

While the invention has been described in relation to certain preferred embodiments, numerous alterations, modifications, and changes to the described embodiments are possible without departing from the spirit and scope of the invention, as defined in the appended claims, and equivalents thereof.

What is claimed is:

1. A fluid friction coupling comprising:
    a driving element, the driving element including a driving disk and a driving shaft;
    a driven-end coupling housing including a reservoir chamber and a working chamber wherein the driving disk rotates in the working chamber;
    a partition for separating the reservoir chamber from the working chamber;
    a back-pressure body arranged in the working chamber;
    a return passage arranged in the coupling housing between the working chamber and the reservoir chamber wherein the coupling housing includes a hole between the outside of the coupling housing and the return passage;
    one of a plug and a valve insertion cartridge for sealing said hole;
    an inlet opening between the reservoir chamber and the working chamber;
    a valve lever for controlling the inlet opening; and
    a differential pressure valve arranged in the region of the return passage and accessible through said hole, which differential pressure valve opens toward the reservoir chamber at a defined differential pressure between the working chamber and the reservoir chamber.

2. The fluid friction coupling as claimed in claim 1, wherein the differential pressure valve is a non-return valve.

3. The fluid friction coupling as claims in claim 2, wherein the differential pressure valve is a spring-loaded ball valve.

4. The fluid friction coupling as claimed in claim 1, wherein the return passage includes an axially extending part and wherein the differential pressure valve is arranged in said hole which is arranged parallel to an axis of rotation of the coupling, which hole is aligned with the axially extending part of the return passage.

5. The fluid friction coupling as claimed in claim 1, wherein the return passage includes a radially extending part and wherein the differential pressure valve is arranged in the radially extending part of the return passage.

6. The fluid friction coupling as claimed in claim 1, wherein the return passage includes a radially extending part and an axially extending part and wherein one of the extending parts is accessible from outside of the coupling.

7. The fluid friction coupling as claimed in claim 6, wherein the radially extending part of the return passage is closed toward the outside by means of a valve insert.

8. The fluid friction coupling as claimed in claim 6, wherein the axially extending part of the return passage or said hole which is aligned with it, is closed toward the outside by said plug.

9. The fluid friction coupling as claimed in claim 1, wherein the differential pressure valve includes an exchangeable spring for varying said defined differential pressure.

10. The fluid friction coupling as claimed in claim 1, further comprising a bimetal unit and a switching pin wherein the valve lever is controlled by the bimetal unit via the switching pin.

11. The fluid friction coupling as claimed in claim 1, wherein the coupling housing further comprises fan blading and a rolling contact bearing wherein the fan blading is carried on the coupling housing and rotatably supported on the driving shaft by the rolling contact bearing.

12. The fluid friction coupling as claimed in claim 3, wherein the spring-loaded ball valve includes a ball and a helical spring.

* * * * *